US010504268B1

(12) United States Patent
Huang et al.

(10) Patent No.: US 10,504,268 B1
(45) Date of Patent: Dec. 10, 2019

(54) SYSTEMS AND METHODS FOR GENERATING FACIAL EXPRESSIONS IN A USER INTERFACE

(71) Applicant: Educational Testing Service, Princeton, NJ (US)

(72) Inventors: Yuchi Huang, North Brunswick, NJ (US); Saad Khan, Yardley, PA (US)

(73) Assignee: Educational Testing Service, Princeton, NJ (US)

(*) Notice: Subject to any disclaimer, the term of this patent is extended or adjusted under 35 U.S.C. 154(b) by 0 days.

(21) Appl. No.: 15/954,969

(22) Filed: Apr. 17, 2018

Related U.S. Application Data

(60) Provisional application No. 62/486,488, filed on Apr. 18, 2017.

(51) Int. Cl.
*G06T 13/40* (2011.01)
*G06K 9/00* (2006.01)

(52) U.S. Cl.
CPC .......... *G06T 13/40* (2013.01); *G06K 9/00302* (2013.01); *G06T 2200/24* (2013.01)

(58) Field of Classification Search
CPC ........ G06N 3/0454; G06N 3/08; G06N 20/00; G06N 3/088; G06N 20/20; G06T 2207/20081; G06T 2207/20084; G06T 2207/10004; G06T 7/11; G06T 13/40; G06T 2200/24; G06K 9/00744; G06K 9/00302
See application file for complete search history.

(56) References Cited

U.S. PATENT DOCUMENTS

2014/0198121 A1* 7/2014 Tong .................. G06T 11/60
345/581

OTHER PUBLICATIONS

Zhang et al., End-to-End Photo-Sketch Generation via Fully Convolutional Representation Learning, ICMR'15, Jun. 23-26, 2015, Shanghai, China, pp. 627-634 (Year: 2015).*

(Continued)

*Primary Examiner* — Haixia Du
(74) *Attorney, Agent, or Firm* — Jones Day (57) ABSTRACT

Example systems and methods are disclosed for generating facial expressions in an avatar-based user interface for a computing device. An example system may include a digital camera, a display device and a user interface application. The digital camera may be configured to capture image data of a user over time. The user interface application may be stored on a non-transitory computer-readable medium and executable by a processor, and may include: an expression feature extractor configured to process the image data of the user to generate a plurality of facial expression descriptor vectors, a sketch generation module configured to use a first conditional deep convolutional generative adversarial network (DC-GAN) model to generate an expressive facial sketch image of an avatar based on the plurality of facial expression descriptor vectors, and an image generation module configured to use a second conditional DC-GAN model to generate a facial expression image from the expressive facial sketch image. The display device may be configured to display the facial expression image as a user interface avatar.

17 Claims, 9 Drawing Sheets

(56) References Cited

OTHER PUBLICATIONS

Isola et al., Image-to-Image Translation with Conditional Adversarial Networks, CoRR, vol. abs/1611.07004, submitted on Nov. 21, 2016, obtained from file:///C:/Users/hdu2/Documents/e-Red%20Folder/15954969/image-to-image%20translation.pdf on Jun. 5, 2019. 16 pages. (Year: 2016).*
Manual of Emotient's Facet SDK; iMotions, Inc.; 2013.
Barsade, Sigal; The Ripple Effect: Emotional Contagion and Its Influence on Group Behavior; Administrative Science Quarterly, 47(4); pp. 644-675; Dec. 2002.
Bazaldua, Diego Luna, Khan, Saad, Von Davier, Alina, Hao, Jiangang, Liu, Lei, Wang, Zuowei; On Convergence of Cognitive and Noncognitive Behvaior in Collaborative Activity; Proceedings of the 8th International Conference on Educational Data Mining; pp. 496-499; 2015.
Bilakhia, Sanjay, Petridis, Stavros, Pantic, Maja; Audiovisual Detection of Behavioural Mimicry; IEEE Humaine Association Conference on Affective Computing and Intelligent Interaction; pp. 123-128; 2013.
Blanz, Volker, Vetter, Thomas; A Morphable Model for the Synthesis of 3D Faces; SIGGRAPH; 1999.
Buy, The Duy, Heylen, Dirk, Poel, Mannes, Nijholt, Anton; Generation of Facial Expressions from Emotion Using a Fuzzy Rule Based System; AI 2001: Advances in Artificial Intelligence; pp. 83-94; 2001.
Cassell, Justine, Pelachaud, Catherine, Badler, Norman, Steedman, Mark, Achorn, Brett, Becket, Tripp, Douville, Brett, Prevost, Scott, Stone, Matthew; Animated Conversation: Rule-Based Generation of Facial Expression, Gesture & Spoken Intonation for Multiple Conversational Agents; SIGGRAPH; pp. 413-420; May 1994.
DeVault, David, et al.; SimSensei Kiosk: A Virtual Human Interviewer for Healthcare Decision Support; Proceedings of the 13th International Conference on Autonomous Agents and Multi-Agent Systems (AAMAS); pp. 1061-1068; Jan. 2014.
Sperber, Dan, Wilson, Deirdre; Relevance: Communication and Cognition, 2d Ed.; Wiley-Blackwell, UK; 1995.
Frith, Chris; Role of Facial Expressions in Social Interactions; Philosophical Transactions of the Royal Society, 364(1535); pp. 3453-3458; Dec. 2009.
Goodfellow, Ian, Pouget-Abadie, Jean, Mizra, Mehdi, Warde-Farley, David, Ozair, Sherjil, Courville, Aaron, Bengio, Yoshua; Generative Adversarial Nets; Advances in Neural Information Processing Systems; 2014.
Ioffe, Sergey, Szegedy, Christian; Batch Normalization: Accelerating Deep Network Training by Reducing Internal Covariate Shift; ArXis; Feb. 2015.
Isola, Phillip, Zhu, Jun-Yan, Zhou, Tinghui, Efros, Alexei; Image-to-Image Translation with Conditional Adversarial Networks; ArXis; Nov. 2016.
Morris, J.S., Ohman, A., Dolan, R.J.; A Subcortical Pathway to the Right Amygdala Mediating "Unseen" Fear; Proceedings of the National Academy of Sciences of the United States of America, 96(4); pp. 1680-1685; Feb. 1999.
Thies, Justus, Zollhofer, Michael, Stamminger, Marc, Theobalt, Christian, Niessner, Matthias; Face2Face: Real-Time Face Capture and Reenactment of RGB Videos; IEEE Conference on Computer Vision and Pattern Recognition; 2016.
Kampe, Knut., Frith, Chris, Frith, Uta; "Hey John": Signals Conveying Communicative Intention Toward the Self Activate Brain Regions Associated with "Mentalizing," Regardless of Modality; Journal of Neuroscience, 23(12); pp. 5258-5263; Jun. 2003.
Kazemi, Vahid, Sullivan, Josephine; One Millisecond Face Alignment with an Ensemble of Regression Trees; in CVPR; 2014.
Lakin, Jessica, Jefferis, Valerie, Cheng, Clara; Chartrand, Tanya; the Chameleon Effect as Social Glue: Evidence for the Evolutionary Significance of Nonconscious Mimicry; Journal of Nonverbal Behavior, 27(3); pp. 145-162; Fall 2003.
Li, Chuan, Wand, Michael; Precomputed Real-Time Texture Synthesis with Markovian Generative Adversarial Networks; ECCV; Apr. 2016.
Mathieu, Michael, Couprie, Camille, LeCun, Yann; Deep Multi-Scale Video Prediction Beyond Mean Square Error; ArXiv; Nov. 2015.
Hoque, Mohammed, Courgeon, Matthieu, Martin, Jean-Claude, Mutlu, Bilge, Picard, Rosalind; Mach: My Automated Conversation coacH; Proceedings of the 15th International Conference on Ubiquitous Computing (Ubicomp); 2013.
Mirza, Mehdi, Osindero, Simon; Conditional Generative Adversarial Nets; ArXiv; Nov. 2014.
Radford, Alec, Metz, Luke, Chintala, Soumith; Unsupervised Representation Learning with Deep Convolutional Generative Adversarial Networks; ArXiv; Nov. 2015.
Reed, Scott, Akata, Zeynep, Yan, Xinchen, Logeswaran, Lajanugen, Schiele, Bernt, Lee, Honglak; Generative Adversarial Text to Image Synthesis; Proceedings of the 23rd International Conference on Machine Learning; New York, NY; 2016.
Ohman Arne, Soares, Joaquim; Emotional Conditioning to Masked Stimuli: Expectancies for Aversive Outcomes Following Nonrecognized Fear-Relevant Stimuli; Journal of Experimental Psychology, 127(1); pp. 69-82; Mar. 1998.
Susskind, Joshua, Hinton, Geoffrey, Movellan, Javier, Anderson, Adam; Generating Facial Expressions with Deep Belief Nets; Ch. 23 in in Affective Computing, Emotion Modelling, Synthesis and Recognition; I-Tech Education and Publishing; 2008.
Tawfik, Andrew, Sanchez, Lenny, Saparova, Dinara; The Effects of Case Libraries in Supporting Collaborative Problem-Solving in an Online Learning Environment; Technology, Knowledge and Learning, 19(3); pp. 337-358; Oct. 2014.
Welch, B. L.; The Generalization of "Student's" Problem When Several Different Population Variances are Involved; Biometrika, 34(1/2); pp. 28-35; Jan. 1947.
Wikipedia; Mirroring (psychology); Oct. 2016.
Word, Carl, Zanna, Mark, Cooper, Joel; the Nonverbal Mediation of Self-Fulfilling Prophecies in Interracial Interaction; Journal of Experimental Social Psychology, 10(2); pp. 109-120; Mar. 1974.
Wu, Jiajun, Zhang, Chengkai, Xue, Tianfan, Freeman, William, Tenenbaum, Joshua; Learning a Probabilistic Latent Space of Object Shapes via 3D Generative-Adversarial Modeling; 30th Conference on Neural Information Processing Systems; 2016.
Zeiler, Matthew, Taylor, Graham, Sigal, Leonid, Matthews, Iain, Fergus, Rob; Facial Expression Transfer with Input-Output Temporal Restricted Boltzmann Machines; Advances in Neural Information Processing Systems 24: 25th Annual Conference on Neural Information Processing Systems; pp. 1629-1637; 2011.
Zhou, Yipin, Berg, Tamara; Learning Temporal Transformations From Time-Lapse Videos; Proceedings of European Conference on Computer Vision (ECCV); 2016.
Zhu, Jun-Yan, Krahenbuhl, Philipp, Shechtman, Eli, Efros, Alexei; Generative Facial Manipulation on the Natural Image Manifold; Proceedings of European Conference on Computer Vision (ECCV); 2016.

* cited by examiner

| | Joy | Anger | Surprise | Fear | Contempt | Disgust | Sadness | Neutral |
|---|---|---|---|---|---|---|---|---|
| Interviewer | 1.0 | 2.45e-5 | 8.31e-7 | 8.07e-4 | 9.17e-10 | 9.41e-4 | 4.13e-9 | 8.50e-12 |
| Interviewee | 1.0 | 7.95e-6 | 6.81e-6 | 0.0166 | 4.05e-5 | 4.02e-4 | 3.82e-5 | 3.68e-8 |

SYSTEMS AND METHODS FOR GENERATING FACIAL EXPRESSIONS IN A USER INTERFACE

CROSS-REFERENCE TO RELATED APPLICATION

This disclosure claims priority to and benefit from U.S. Provisional Patent Application No. 62/486,488, filed on Apr. 18, 2017, titled "DyadGAN: Generating Facial Expressions in Dyadic Interactions," the entirety of which is incorporated herein by reference.

TECHNICAL FIELD

The technology described herein relates generally to an avatar-based user interface, and more particularly to facial expression generation in human-avatar interactions.

BACKGROUND

Advances in automated speech recognition and natural language processing have made possible virtual personal assistants. These virtual assistants have found application in a plethora of everyday activities from helping people manage daily schedules and appointments, to searching the Internet for their favorite songs. However, being primarily speech driven, such virtual agents are inherently limited in their ability to sense and understand user behavior and thereby adequately address their needs. Human interaction is a highly complex interplay of verbal and non-verbal communication patterns that among other skills demonstrates a keen ability to convey meaning through finely calibrated facial expressions. Recent research in autonomous avatars aims to develop powerful human-computer interfaces that mimic such abilities. However, producing realistic facial expressions in avatars that are appropriately contextualized and responsive to the interacting human remains a significant challenge.

SUMMARY

Example systems and methods are disclosed for generating facial expressions in an avatar-based user interface for a computing device. An example system may include a digital camera, a display device and a user interface application. The digital camera may be configured to capture image data of a user over time. The user interface application may be stored on a non-transitory computer-readable medium and executable by a processor, and may include: an expression feature extractor configured to process the image data of the user to generate a plurality of facial expression descriptor vectors, a sketch generation module configured to use a first conditional deep convolutional generative adversarial network (DC-GAN) model to generate an expressive facial sketch image of an avatar based on the plurality of facial expression descriptor vectors, and an image generation module configured to use a second conditional DC-GAN model to generate a facial expression image from the expressive facial sketch image. The display device may be configured to display the facial expression image as a user interface avatar.

A example method of generating an avatar-based user interface for a computing device may include: capturing image data of a user over time using a digital camera; generating a plurality of facial expression descriptor vectors based on the image data; using a first conditional deep convolutional generative adversarial network (DC-GAN) model to generate an expressive facial sketch image of an avatar based on the plurality of facial expression descriptor vectors; using second conditional DC-GAN model to generate a facial expression image from the expressive facial sketch image; and displaying the facial expression image as a user interface avatar on a display device.

DETAILED DESCRIPTION

Communication involves both verbal and nonverbal ways of making sure our message is heard. A simple smile can indicate our approval of a message, while a scowl might signal displeasure or disagreement. Moreover, the sight of a human face expressing fear elicits fearful responses in the observer, as indexed by increases in autonomic markers of arousal and increased activity in the amygdala. This process whereby an observer tends to unconsciously mimic the behavior of the person being observed has been shown to impact a variety of interpersonal activities such as collaboration, interviews and negotiations among others. In parallel with the unconscious face processing route there is a conscious route, which is engaged, for example, when volunteers are explicitly asked to identify facial expressions or to consciously use facial expression as communicative signals in closed loop interactions. In many situations, an additional cue (an ostensive signal such as briefly raised eyebrows when making eye contact) is produced to indicate that the signaling is deliberate.

Conditional Generative Adversarial Networks (GANs) are generative models that learn a mapping from random noise vector z to output image y conditioned on auxiliary information x: $G:(x,z) \rightarrow y$. A conditional GAN consists of a generator $G(x,z)$ and a discriminator $D(x,y)$ that compete in a two-player minimax game: the discriminator tries to distinguish real training data from generated images, and the generator tries to fail the discriminator. That is, D and G play the following game on V (D,G)

$$\min_{G}\max_{D} \mathcal{L}(D, G) = \qquad (1)$$

-continued $$\mathbb{E}_{x,y \sim p_{data}(x,y)}[\log D(x, y)] + \mathbb{E}_{x,\sim p_{data}(x),z \sim p_z(z)}[\log(1 - D(x, G(x, z)))].$$

The present disclosure utilizes the study of human dyadic interactions to address the problem of facial expression generation in human-avatar dyadic interactions using conditional Generative Adversarial Networks (GANs). In this way, a model may be constructed that takes into account behavior of one individual in generating a valid facial expression response in their virtual dyad partner. To this end, FIG. 1 depicts an example system and method 10 for generating an expressive avatar image using a two level optimization of GANs in interviewer-interviewee dyadic interactions.

Figure 1:
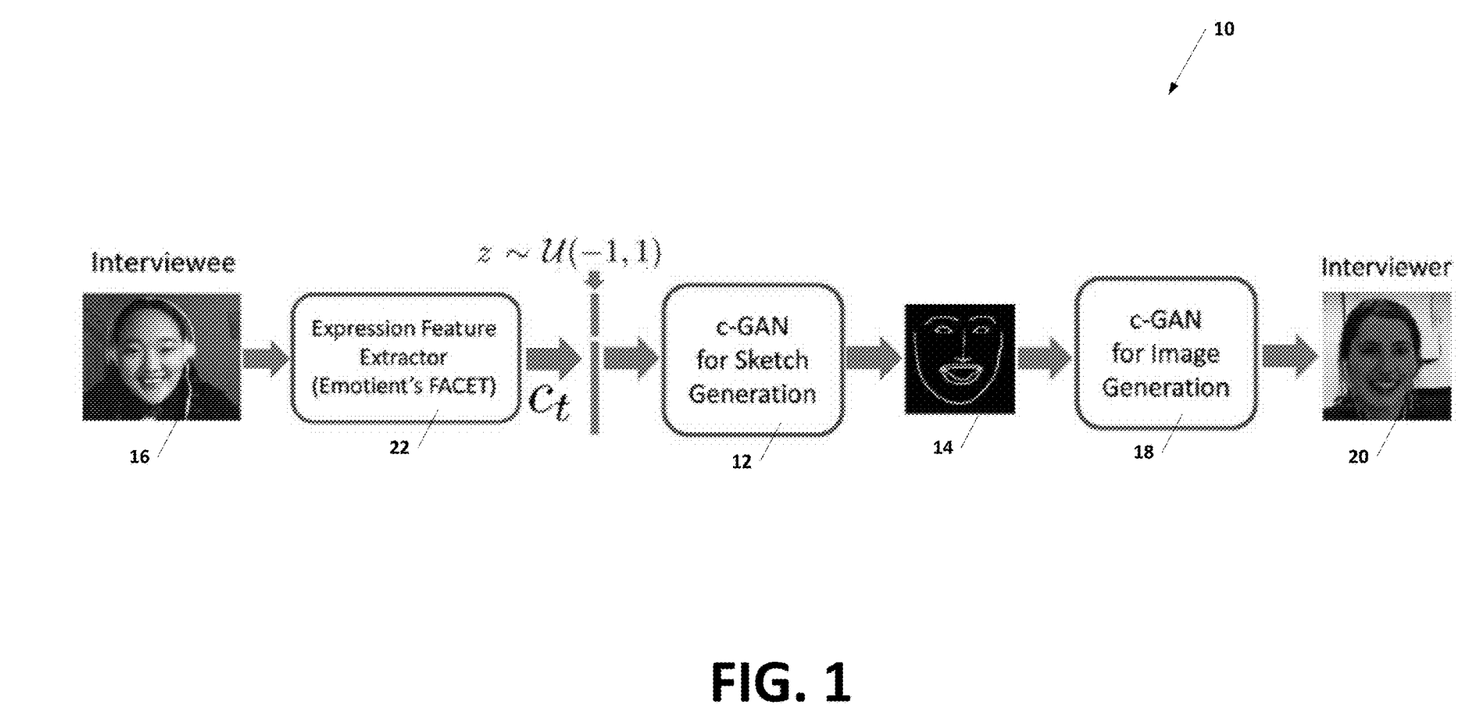
FIG. 1 depicts an example system and method for generating an expressive avatar image using a two level optimization of GANs in interviewer-interviewee dyadic interactions.

The example depicted in FIG. 1 includes a first stage 12, in which face sketches 14 of the interviewer are generated conditioned on facial expressions of the interviewee 16, and a second stage 18, in which complete face images 20 are synthesized conditioned on the face sketches 14 generated during the first stage 12. The model is effective at synthesizing visually compelling face images in dyadic interactions. Moreover, the facial expressions depicted in the generated interviewer face images 20 reflect valid emotional reactions to the interviewee behavior.

The systems and methods disclosed herein were derived, at least in part, from a study of interviewer-interviewee dyadic interactions performed by the inventors. The study dataset included 31 video conference interviews conducted at the University of Rochester as part of an undergraduate admissions process. The purpose of interviews was to assess the English speaking ability of the candidates. All participants were consenting adults that agreed to the release of data for scientific research. The interviewees were prospective college students from a variety of ethnic backgrounds with a nearly even gender split (16 male and 15 female candidates). Each candidate was interviewed by the same interviewer (Caucasian female) who followed a predetermined set of academic and nonacademic questions designed to encourage open conversation and gather evidence of the candidate's English speaking ability. The interviews were conducted using videoconferencing so that the participants could see and hear each other and the video data from each dyadic interaction was captured. The duration of interviews varied from 8 to 37 minutes and the total dataset consists of 24 hours of video data (when including both interviewee and interviewer videos). It should be noted that since the interviewer is the same in each dyad, an advantage of this dataset is that it provides a significant amount of data under varying stimuli (31 different candidates) to adequately model the interviewer's behavior in this context.

With reference again to FIG. 1, an emotion analysis engine 22, such as FACET SDK sold by Emotient, Inc, is used to process the dataset and generate per-frame, 8-dimensional facial expression descriptor vectors, representing likelihoods of the following classes: Joy, Anger, Surprise, Fear, Contempt, Disgust, Sadness and Neutral. Each value in the original descriptor represents the likelihood, in logarithmic (base 10) scale, of a target expression/affect being present. The evidence values typically range from −2 to 2 and can be transformed into the probability of an expression/attitude as follows:

$$P = \frac{1}{1 + 10^{-r}}. \quad (2)$$

Figures 3, 4:
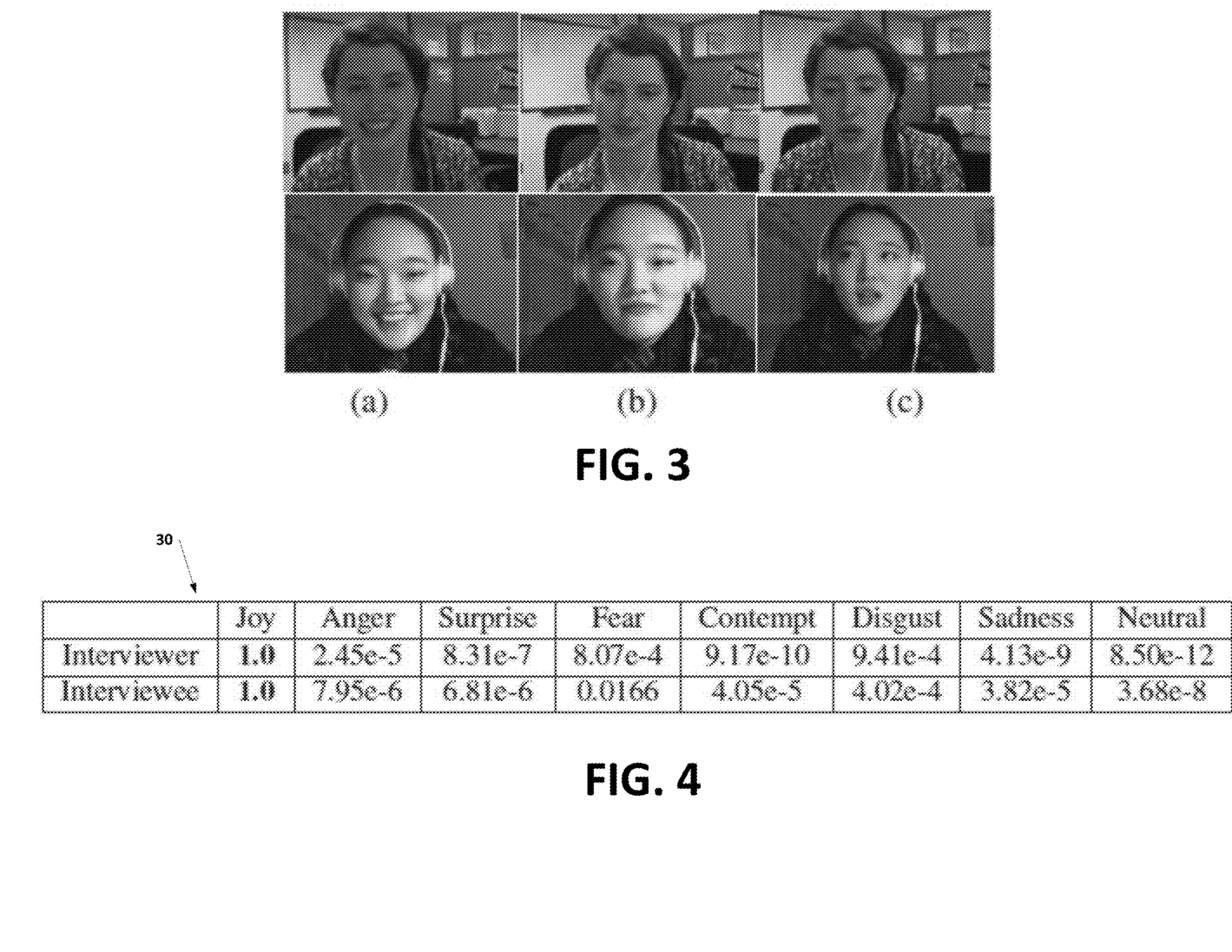
FIG. 3 show facial images of participants in a dyadic interaction.
FIG. 4 is a table illustrating example expression probability values of two participants in a dyad.

The table 30 depicted in FIG. 4 illustrates the computed expression probability values of two study participants in a dyad, as shown in FIG. 3. FIG. 3 shows facial images of the two study participants (interviewer on top and interviewee on bottom) at three times (labeled (a), (b) and (c)) during the study described above. The expression/attitude probability scores shown in table 30 of FIG. 4 were calculated based on the images at time (a) in FIG. 3. Comparing FIGS. 3 and 4 it can be seen that the high expression/attitude probability score (1.0) for the "Joy" expression shown in table 30 of FIG. 4 is consistent with the image content shown at time (a) in FIG. 3.

As detailed below, the example method 10 depicted in FIG. 1 uses the transformed facial expression descriptor d containing calculated probabilities of emotions. A neutral face of an individual can have a default appearance that resembles any of the expression categories. In order to remove this bias, before performing the transformation in Equation 2, an emotion analysis engine, such as FACET SDK, may be used to obtain a baseline expression descriptor. All measurements of the same person may be processed by a simple subtraction using the baseline value before further computation.

Humans display a wide range of facial expressions, often with subtle differences to convey highly contextualized emotional states. With reference again to FIG. 1, the disclosed example 10 addresses this as a tractable optimization problem that divides the model into two stages 12, 18. The first stage 12 is a conditional deep convolutional generative adversarial network (DC-GAN) designed to produce expressive facial sketch images 14 of the interviewer that are conditioned on the interviewee's facial expressions. The second stage 18 is another DC-GAN to transfer refined sketch images 14 into real facial expression images 20.

On both stages 12, 18, generator and discriminator architectures may be adapted from and use modules of the form convolution-BatchNorm-ReLu to stabilize optimization. A training phase may utilize a mini-batch SGD and apply the Adam solver. To avoid the fast convergence of discriminators, generators may be updated twice for each discriminator update, which differs from the original setting in that the discriminator and generator update alternately.

Figure 2:
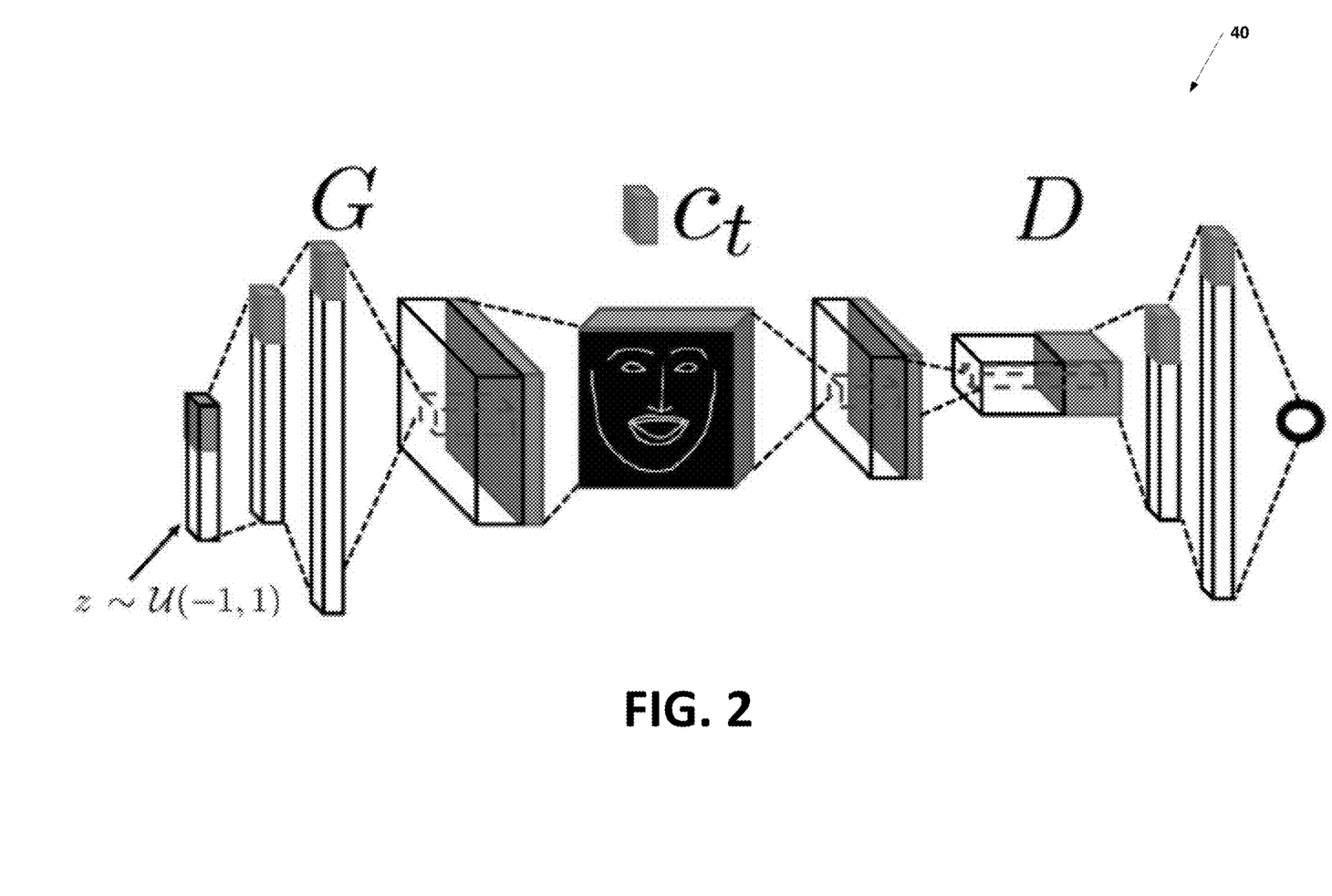
FIG. 2 illustrates an example of a training procedure performed in the first stage of FIG. 1.

FIG. 2 illustrates an example of a training procedure 40 performed in the first stage 12 of FIG. 1. In the generator G, a 100 dimension noise z is sampled from the uniform prior U(−1,1) and encoded with a temporal facial expression feature cr computed from interviewee videos as shown below in equation (3). For each frame of the interviewer at time t, the facial expression descriptors of the associated interviewee data are considered between [t−δt,t]. A time weighted average is empirically used on all expression descriptors in [t−δt,t]:

$$c_t = \frac{\sum_{\tau \in [t-\delta t, t]} w_\tau d_\tau}{\sum_{\tau \in [t-\delta t, t]} w_\tau}, \quad (3)$$

$$w_\tau = \exp\left(\frac{\tau - t}{\delta t}\right). \quad (4)$$

Each element in $c_t$ is normalized to [0, 1] before $c_t$ is used as input conditional vectors in the first level of the model.

The input is passed to two fully connected layers followed by batch normalization and rectified linear (ReLU) processing. The inference then proceeds as in a normal up-sampling layer followed by a Sigmoid function. In the model, the auxiliary information $c_t$ is combined with intermediate features in all layers to magnify its influence: in full connection layers, $c_t$ is simply concatenated with input/output features; in up-sampling layers, $c_t$ is replicated spatially and depth-concatenated with feature maps.

In the discriminator D, a real or fake (generated) sketch image is depth concatenated with $c_t$. The combined input goes through two layers of stride-2 convolution with spatial batch normalization followed by leaky ReLU. Again two full connection layers are employed and the output is produced by a Sigmoid function. Similarly, the facial expression feature is concatenated with features in all layers in the discriminator.

With reference again to FIG. 1, a shape estimation approach is used to generate a training set of real face sketches. On each image frame of the interviewer sampled from dyadic interview videos, a face shape predictor 22 is utilized to obtain a set of 68 landmark points which depict components of human faces, such as eyes, eyebrows, nose, mouth and face out-contour. These landmarks are then linked by piece-wise linear lines of one pixel width.

In the final stage 18 of FIG. 1, the generated face sketches 14 are transformed into complete facial expression images 20. To fulfill the training of this stage and construct sketch-image pairs, the sketch training set for the first stage as input to the generator and corresponding sampled facial expression images are used as the input to the discriminator. For each pair the sketch is strictly aligned with the corresponding face image, a sketch is passed through an encoder network containing 8 down-sampling layers, and then a decoding network composed of 8 up-sampling layers is used to produce an image. To share the low-level information between input and output, a U-Net strategy is employed to concatenate corresponding feature maps of encoding and decoding layers, that is, all feature maps at the layer i of the encoding network are combined with those at layer n in the decoding networks, where n=8.

In the training phase of the sketch to image generation stage, the GAN objective in equation 1 is combined with a $L_1$ loss to enhance image quality of outputs:

$$\mathcal{L}_{L1}(G) = \mathbb{E}_{x,y \sim p_{data}(x,y), z \sim p_z(z)}[\|y - G(x,z)\|_1], \quad (5)$$

$$G^* = \mathcal{L}(D,G) + \lambda \mathcal{L}_{L1}(G). \quad (6)$$

where $G^*$ is the final objective. In practice, a fixed value of $\lambda=100$ may be utilized. In such an approach, the discriminators task remains unchanged, i.e., distinguish real facial expression images from generated ones, but the generator's job is to not only fail the discriminator, but also to produce images matching the real samples y (the input to the discriminator) in an $L_1$ sense. The noise signal of z is not explicitly fed into this stage; instead randomness is only provided in the form of dropout, applied on first 3 layers in the encoding network of the generator at both training and inference time.

Figure 5:
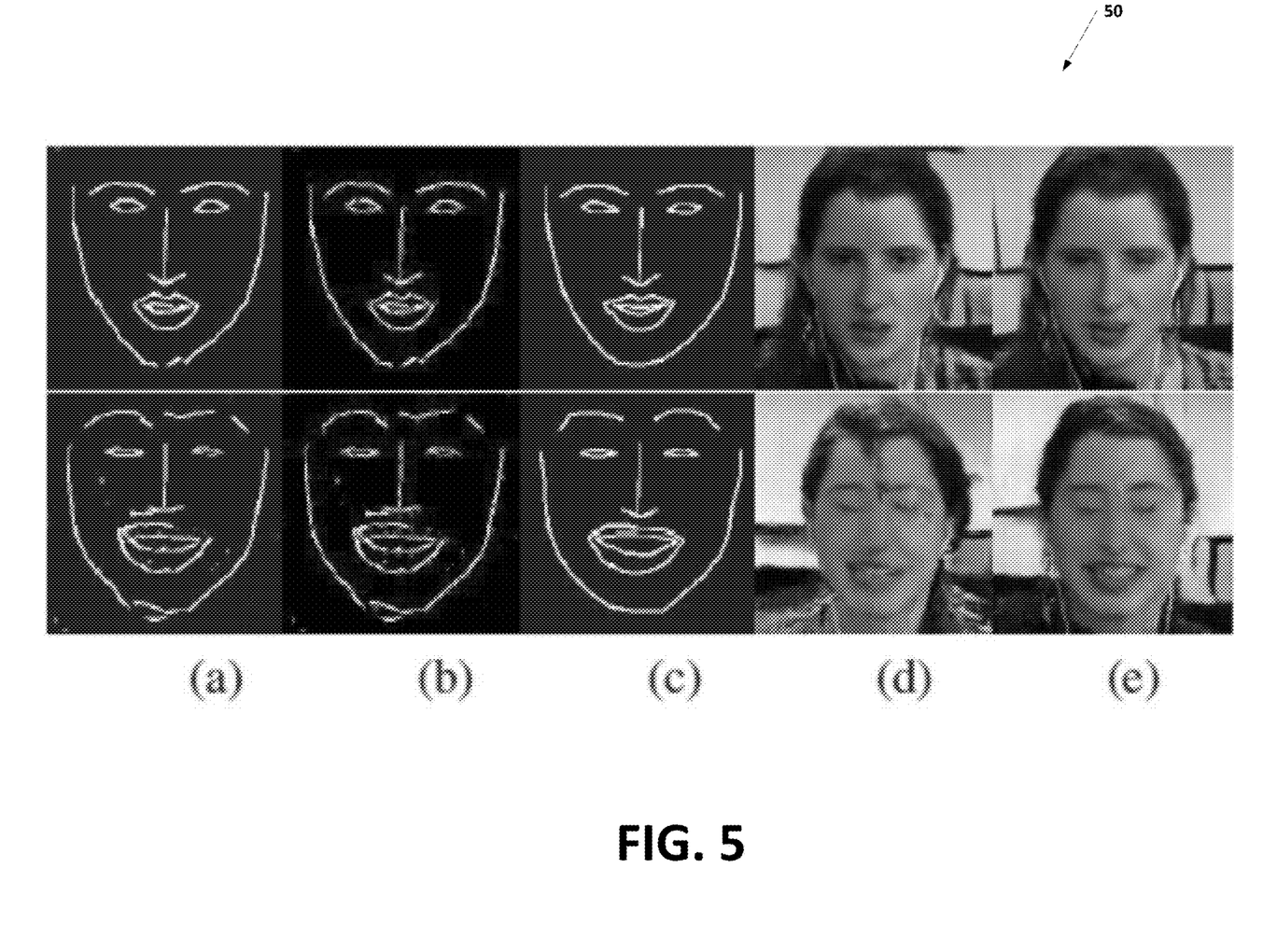
FIG. 5 is an example demonstrating an example of a sketch de-noising process.

As introduced above, the sketches used in training may be produced by linking the landmarks detected from real images. The lines in these sketches are noise-free with a width of one pixel. However, during the inference phase, noisy sketches generated from the first stage (expressive face sketch generation) may be used as inputs for reference. As shown in FIG. 5, these noisy sketches deteriorate the quality of output images. To fix this issue, a shape predictor may be trained by using pairs of sketches and landmark sets. The shape predictor may then be deployed on noisy sketches to locate key landmarks and connect them with piece-wise linear lines to obtain cleaned sketches.

FIG. 5 is an example 50 demonstrating how the sketch de-noising process may benefit facial expression generation. Specifically, column (a) of FIG. 5 shows examples of noisy sketches generated by the first stage 12 of FIG. 1, column (b) of FIG. 5 shows a landmark relocation of the noisy sketches (denoted by the dots), and column (c) of FIG. 5 shows cleaned sketches. Column (d) of FIG. 5 illustrates an example of output facial expressions generated using the noisy sketches of column (a) as an input, and column (e) shows an example of output facial expressions generated using the cleaned sketches of column (c).

Figure 6:
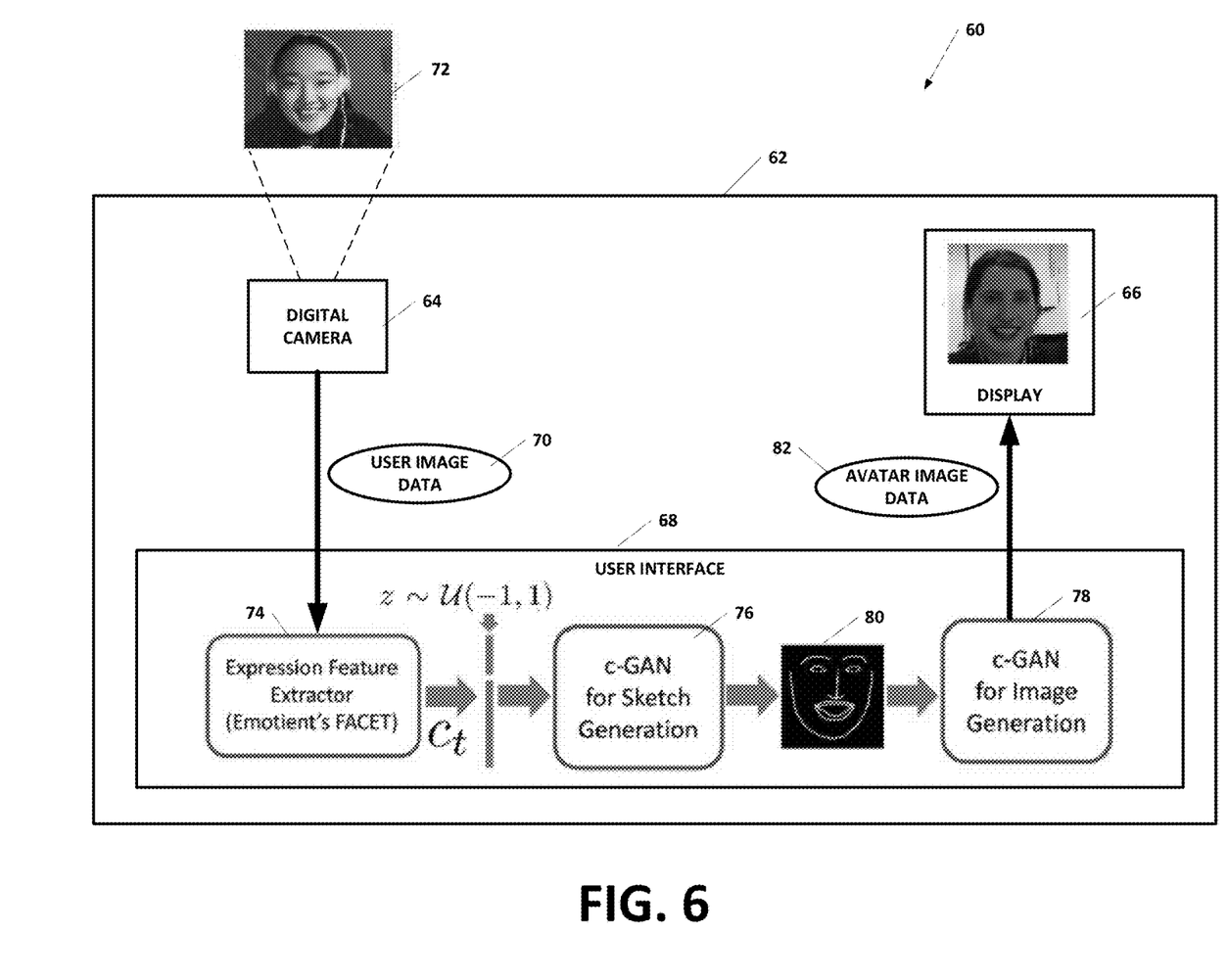
FIG. 6 is a diagram of an example system for generating facial expressions in an avatar-based user interface for a computing device.

FIG. 6 is a diagram of an example system 60 for generating facial expressions in an avatar-based user interface for a computing device 62. The computing device 62 includes a digital camera 64, a display device 66, and a user interface application 68 that is stored on a non-transitory computer-readable medium and executable by a processor. The digital camera 64 is configured to capture image data 70 of a system user 72 over time. The user interface 68 is configured to generate an avatar image on the display device 66, using the technology described above with reference to FIGS. 1-5, that includes facial expressions conditioned on the facial expressions of the device user 72.

The user interface 68 includes an expression feature extractor 74, a sketch generation module 76 and an image generation module 78. The expression feature extractor 74 is configured to process the image data 70 to generate a plurality of facial expression descriptor vectors. The sketch generation module 76 is configured to use a first conditional deep convolutional generative adversarial network (DC-GAN) model to generate an expressive facial sketch image 80 of the avatar based on the plurality of facial expression descriptor vectors. The image generation module 78 is configured to use a second DC-GAN model to generate a facial expression image 82 from the expressive facial sketch image 80. The display device 66 is configured to display the facial expression image 82 as a user interface avatar.

Figure 7:
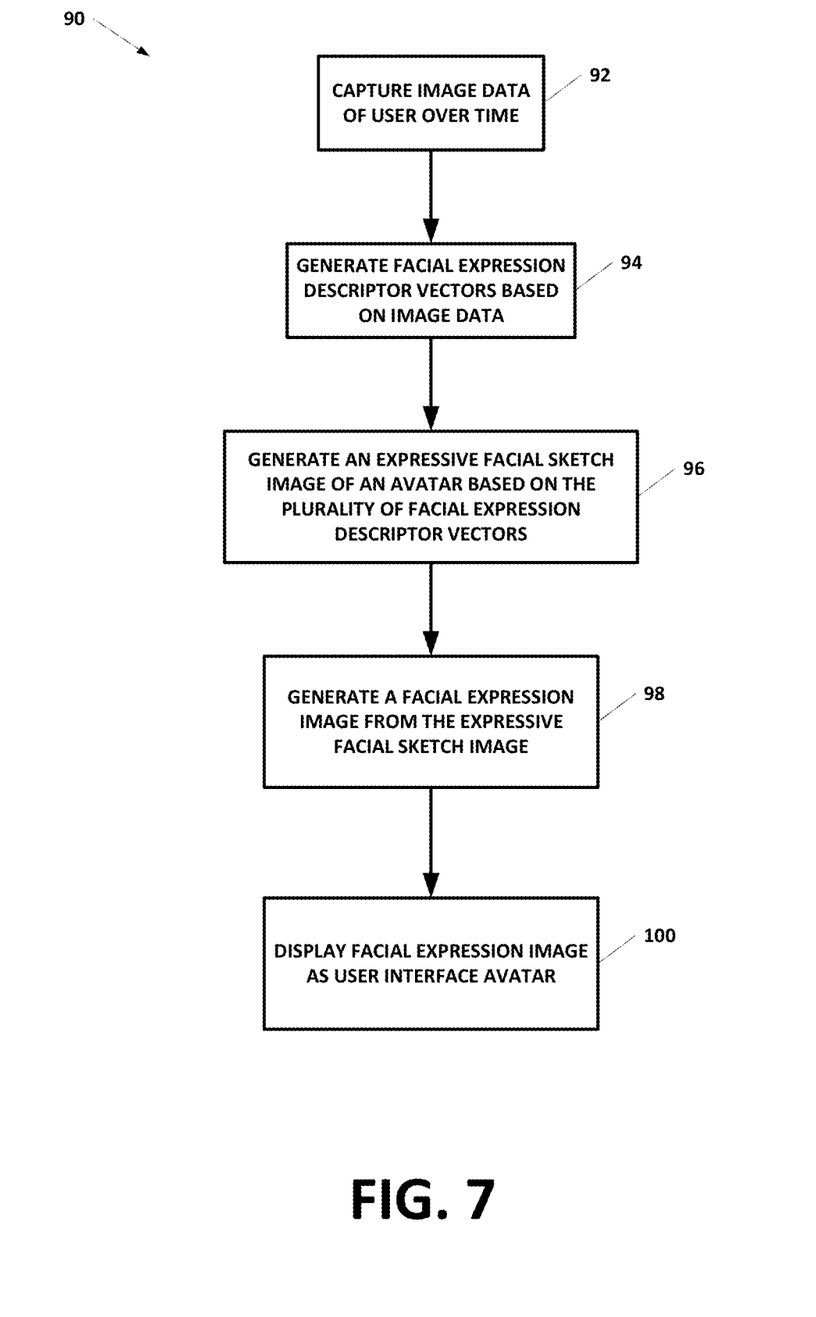
FIG. 7 is a flow diagram of an example method for generating facial expressions in an avatar-based user interface for a computing device.

FIG. 7 is a flow diagram of an example method 90 for generating facial expressions in an avatar-based user interface for a computing device. The method 90 may be performed using the technology described above with reference to FIGS. 1-5. At 92, image data is captured over time, for example using a digital camera in the computing device. At 94, a plurality of facial expression descriptor vectors are generated based on the image data. At 96, an expressive facial sketch image of an avatar is generated based on the plurality of facial expression descriptor vectors, for example using a first DC-GAN model as described above. At 98, a facial expression image is generated from the expressive facial sketch image, for example using a second DC-GAN model as described above. At 100, the facial expression image is displayed as a user interface avatar on a display device.

In embodiments, the systems and methods disclosed herein may be extended to multi-interviewer scenarios, and to have a larger dataset with multiple interviewer identities, for example by utilizing standard style transfer techniques, or more sophisticated shape registration methods could be performed to align face shapes of different identities to a tangent space before the GAN training. To enhance the generation quality, different forms of loss function could also be used to better regularize the GAN objective. In embodiments, the disclosed systems and methods may be combined with a temporal recurrent network, such as LSTM, to synthesize continuous video frames of facial expressions in dyadic interactions.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The methods and systems described herein may be implemented using any suitable processing system with any suitable combination of hardware, software and/or firmware, such as described below with reference to the non-limiting examples of FIGS. 8, 9A, 9B and 9C.

Figure 8:
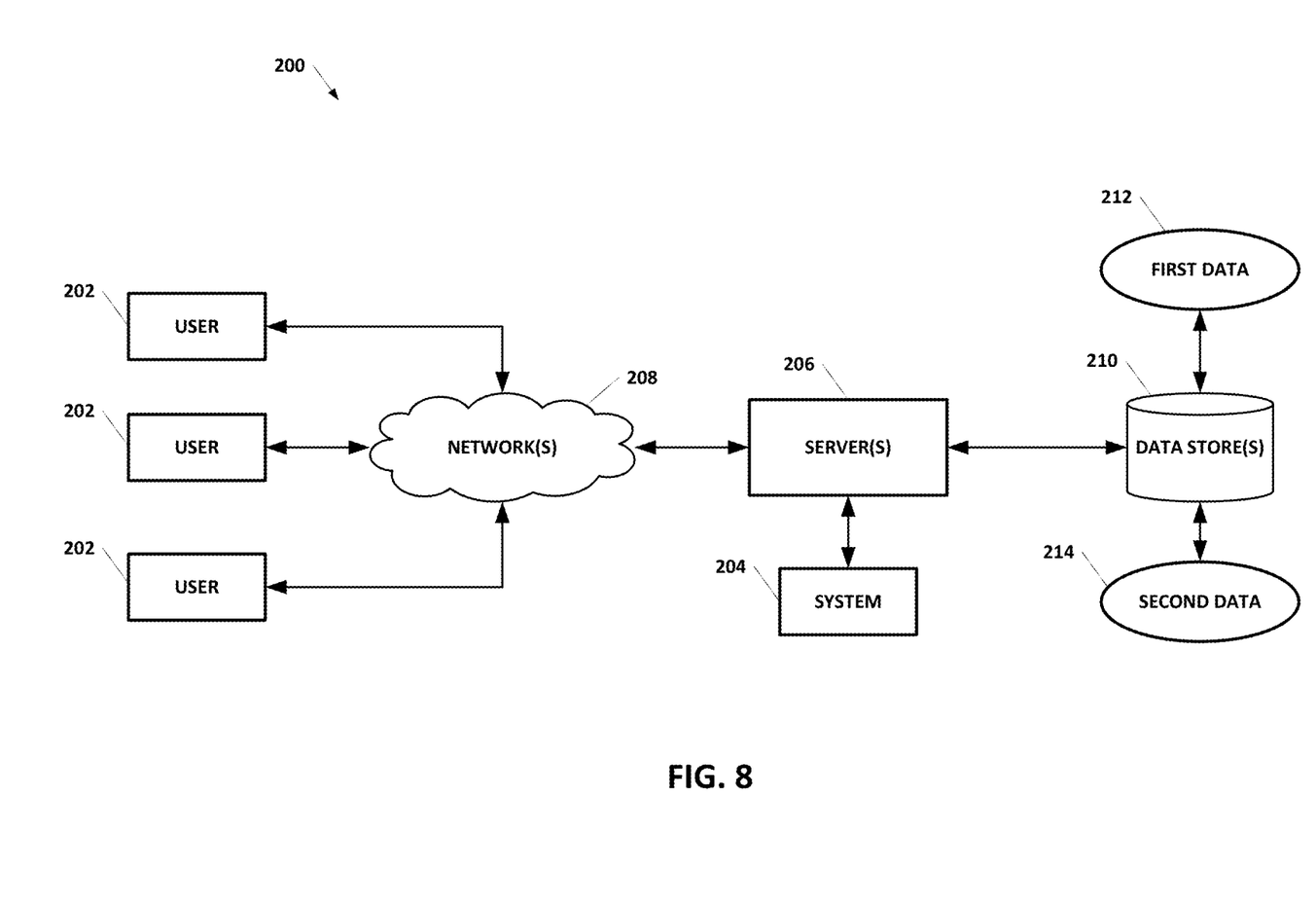
FIGS. 8, 9A, 9B and 9C depict example systems that may be used to implement the technology disclosed herein.

FIG. 8 depicts at 200 a computer-implemented environment wherein users 202 can interact with a system 204 hosted on one or more servers 206 through a network 208. The system 204 contains software operations or routines. The users 202 can interact with the system 204 through a number of ways, such as over one or more networks 208. One or more servers 206 accessible through the network(s) 208 can host system 204. It should be understood that the system 204 could also be provided on a stand-alone computer for access by a user.

Figure 9A:
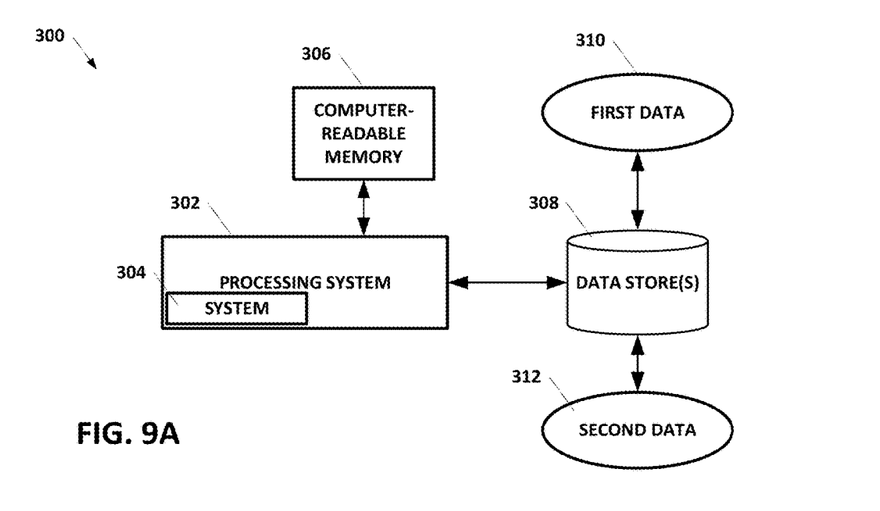
Figure 9B:
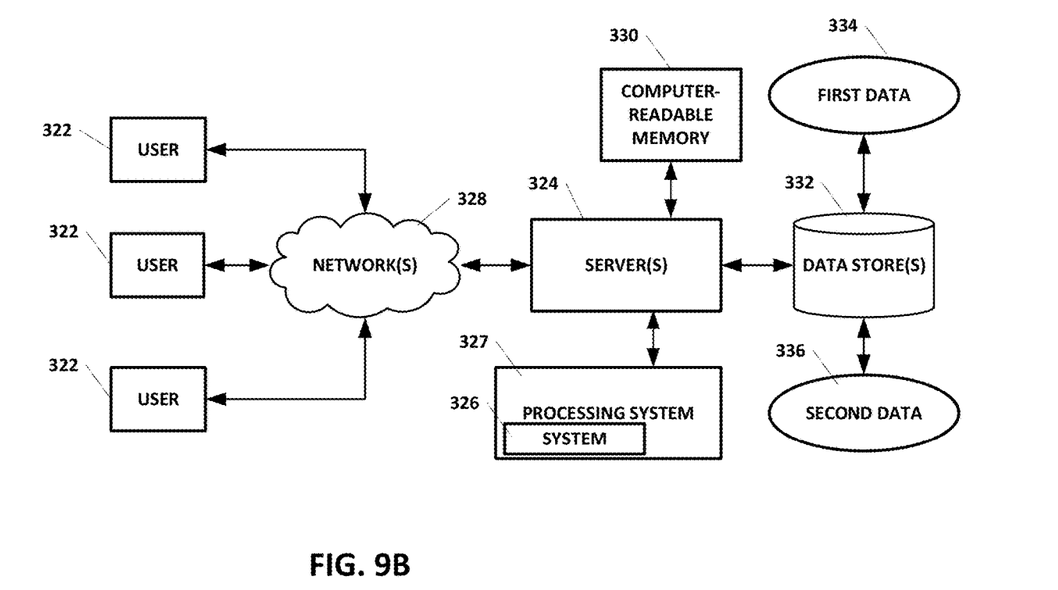
Figure 9C:
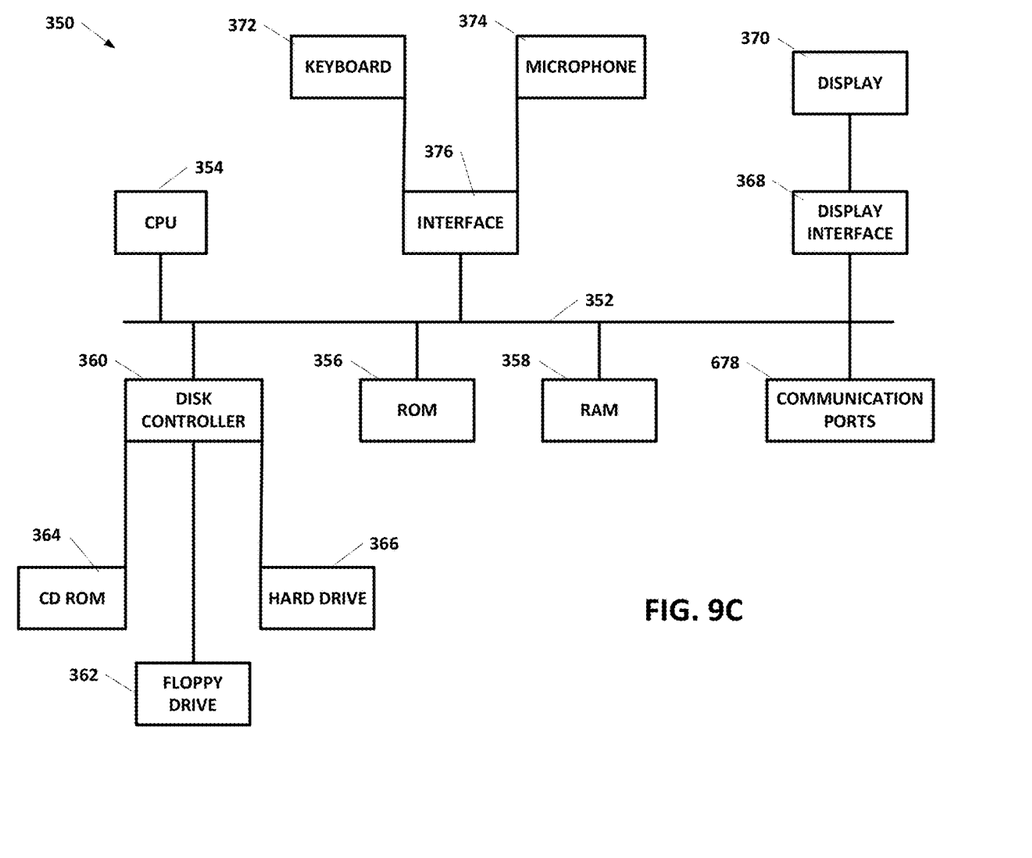

FIGS. 9A, 9B, and 9C depict example systems for use in implementing a system. For example, FIG. 9A depicts an exemplary system 300 that includes a standalone computer architecture where a processing system 302 (e.g., one or more computer processors) includes a system 304 being executed on it. The processing system 302 has access to a non-transitory computer-readable memory 306 in addition to one or more data stores 308. The one or more data stores 308 may contain first data 310 as well as second data 312.

FIG. 9B depicts a system 320 that includes a client server architecture. One or more user PCs 322 accesses one or more servers 324 running a system 326 on a processing system 327 via one or more networks 328. The one or more servers 324 may access a non-transitory computer readable memory 330 as well as one or more data stores 332. The one or more data stores 332 may contain first data 334 as well as second data 336.

FIG. 9C shows a block diagram of exemplary hardware for a standalone computer architecture 350, such as the architecture depicted in FIG. 9A, that may be used to contain and/or implement the program instructions of system embodiments of the present disclosure. A bus 352 may serve as the information highway interconnecting the other illustrated components of the hardware. A processing system 354 labeled CPU (central processing unit) (e.g., one or more computer processors), may perform calculations and logic operations required to execute a program. A non-transitory computer-readable storage medium, such as read only memory (ROM) 356 and random access memory (RAM) 358, may be in communication with the processing system 354 and may contain one or more programming instructions. Program instructions may be stored on a non-transitory computer-readable storage medium such as magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 360 interfaces one or more disk drives to the system bus 352. These disk drives may be external or internal floppy disk drives such as 362, external or internal CD-ROM, CD-R, CD-RW or DVD drives such as 364, or external or internal hard drives 366.

Each of the element managers, real-time data buffer, conveyors, file input processor, database index shared access memory loader, reference data buffer and data managers may include a software application stored in one or more of the disk drives connected to the disk controller 360, the ROM 356 and/or the RAM 358. Preferably, the processor 354 may access each component as required.

A display interface 368 may permit information from the bus 356 to be displayed on a display 370 in audio, graphic, or alphanumeric formal. Communication with external devices may occur using various communication ports 378.

In addition to the standard computer-type components, the hardware may also include data input devices, such as a keyboard 372, or other input device 374, such as a microphone, remote control, pointer, mouse and/or joystick.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A system for generating facial expressions in an avatar-based user interface for a computing device, comprising:
   a digital camera configured to capture image data of a user over time;
   a user interface application, stored on a non-transitory computer-readable medium and executable by a processor, the user interface application including,
      an expression feature extractor configured to process the image data of the user to generate a plurality of facial expression descriptor vectors,
      a sketch generation module configured to use a first conditional deep convolutional generative adversarial network (DC-GAN) model to generate an expressive facial sketch image of an avatar based on a time weighted average of the plurality of facial expression descriptor vectors, and an image generation module configured to use a second conditional DC-GAN model to generate a facial expression image from the expressive facial sketch image; and a display device configured to display the facial expression image as a user interface avatar.

2. The system of claim 1, wherein the user interface application is configured to generate a series of facial expression images for successive display by the display device, such that the user interface avatar appears to have facial expressions conditioned on facial expressions of the user.

3. The system of claim 1, wherein the plurality of facial expression descriptor vectors represent likelihoods of a plurality of expression classes being present in the image data of the user.

4. The system of claim 3, wherein the plurality of expression classes include joy, anger, surprise, fear, contempt, disgust, sadness, and neutral.

5. The system of claim 1, wherein the expression feature extractor is further configured to obtain a baseline expression for the image data of the user, wherein the baseline expression is used to remove bias in the generation of the plurality of facial expression descriptor vectors.

6. The system of claim 1, wherein the first and second DC-GAN models are trained based on a dataset of facial images of a pair of participants in a dyadic interaction.

7. A method of generating an avatar-based user interface for a computing device, comprising:
capturing image data of a user over time using a digital camera;
generating a plurality of facial expression descriptor vectors based on the image data;
using a first conditional deep convolutional generative adversarial network (DC-GAN) model to generate an expressive facial sketch image of an avatar based on the plurality of facial expression descriptor vectors;
using second conditional DC-GAN model to generate a facial expression image from the expressive facial sketch image;
displaying the facial expression image as a user interface avatar on a display device; and
training the first and second DC-GAN models based on a dataset of facial images of a pair of participants in a dyadic interaction.

8. The method of claim 7, further comprising:
generating a series of facial expression images for successive display by the display device, such that the user interface avatar appears to have facial expressions conditioned on facial expressions of the user.

9. The method of claim 7, wherein the plurality of facial expression descriptor vectors represent likelihoods of a plurality of expression classes being present in the image data of the user.

10. The method of claim 9, wherein the plurality of expression classes include joy, anger, surprise, fear, contempt, disgust, sadness, and neutral.

11. The method of claim 7, wherein the expressive facial sketch image is generated based on a time weighted average of the plurality of facial expression descriptor vectors.

12. The method of claim 7, further comprising:
obtaining a baseline expression for the image data of the user, wherein the baseline expression is used to remove bias in generating the plurality of facial expression descriptor vectors.

13. A system for generating facial expressions in an avatar-based user interface for a computing device, comprising:
a digital camera configured to capture image data of a user over time;
a user interface application, stored on a non-transitory computer-readable medium and executable by a processor, the user interface application including,
an expression feature extractor configured to process the image data of the user to generate a plurality of facial expression descriptor vectors, wherein the plurality of facial expression descriptor vectors represent likelihoods of a plurality of expression classes being present in the image data of the user,
a sketch generation module configured to use a first conditional deep convolutional generative adversarial network (DC-GAN) model to generate an expressive facial sketch image of an avatar based on the plurality of facial expression descriptor vectors, and
an image generation module configured to use a second conditional DC-GAN model to generate a facial expression image from the expressive facial sketch image; and
a display device configured to display the facial expression image as a user interface avatar.

14. The system of claim 13, wherein the user interface application is configured to generate a series of facial expression images for successive display by the display device, such that the user interface avatar appears to have facial expressions conditioned on facial expressions of the user.

15. The system of claim 13, wherein the plurality of expression classes include joy, anger, surprise, fear, contempt, disgust, sadness, and neutral.

16. The system of claim 13, wherein the expression feature extractor is further configured to obtain a baseline expression for the image data of the user, wherein the baseline expression is used to remove bias in the generation of the plurality of facial expression descriptor vectors.

17. The system of claim 13, wherein the first and second DC-GAN models are trained based on a dataset of facial images of a pair of participants in a dyadic interaction.

* * * * *